May 28, 1957  F. D. SIMPSON  2,793,675

TRUCK TUBE SPLICING METHOD

Filed Dec. 20, 1954

INVENTOR.
Frederick D. Simpson
BY Victor J. Evans & Co.
ATTORNEYS

United States Patent Office 2,793,675
Patented May 28, 1957

2,793,675

TRUCK TUBE SPLICING METHOD

Frederick D. Simpson, Detroit, Mich.

Application December 20, 1954, Serial No. 476,458

1 Claim. (Cl. 154—14)

This invention relates to a method for splicing and repairing tire tubes for trucks, tractors or similar heavy equipment.

The invention contemplates the method of cutting the damaged portion from the tube, and installing a good portion in the tube of the same overall size, and joining the ends of the portion with the remainder of the tube by vulcanization.

In reusing the tubes, the damaged section is removed. A new section is inserted. The section is stitched at its outer edges to the tube. Raw rubber is placed over the splice, and the joint is vulcanized.

New sections containing new valves may also be installed as easily as valveless sections.

In the accompanying drawing, the various steps of the method used are illustrated and Figure 1 is an elevational view of a truck tube having a section thereof damaged by a blowout;

Figure 1:
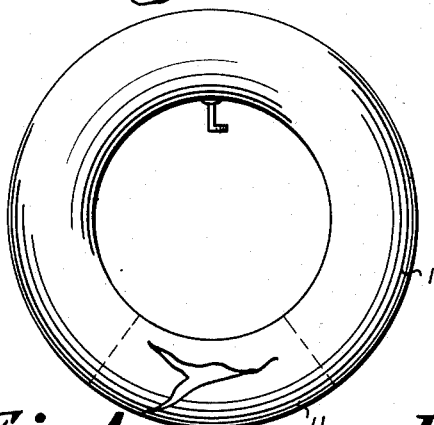
Figure 2:
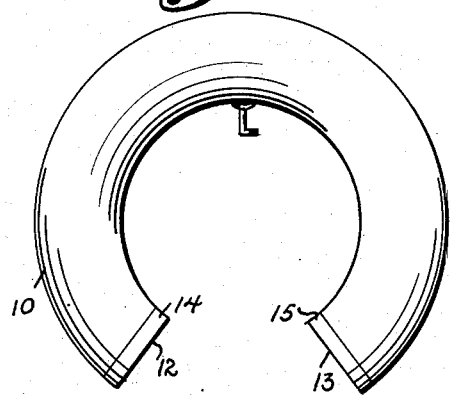
Figure 2 shows the tube after the damaged section has bene removed from the tube, and the edges thereof chamfered.
Figure 3:
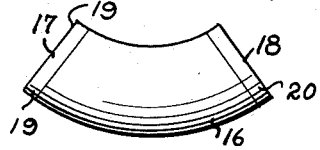
Figure 3 shows an undamaged section with chamfered ends which is to replace the damaged section removed.
Figure 4:
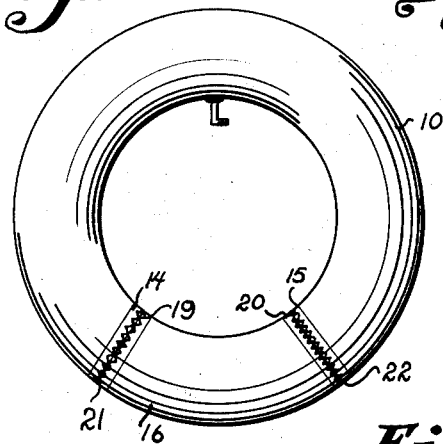
Figure 4 shows the good section in place in the tube and the edges thereof stitched or spliced together, buffed and cemented.
Figure 6:
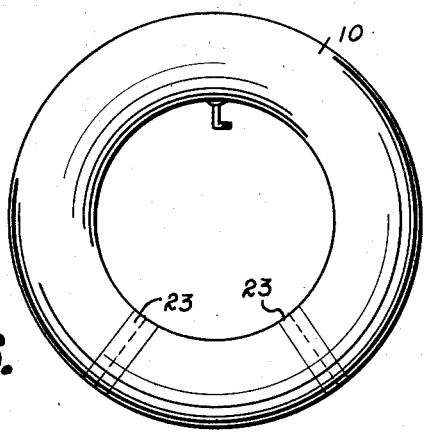
Figure 6 shows the tube after raw rubber has been placed over the splice preparatory to the vulcanization thereof and Figure 7 shows a new section having an air valve therein.
Figure 5:
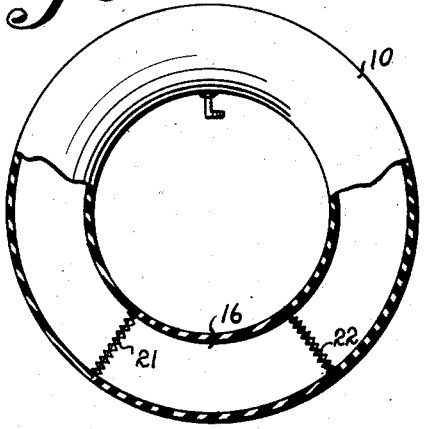
Figure 5 is the same as Figure 4, partly broken away and partly in section to show the interior of the tube.

Referring more in detail to the drawing which is used to illustrate the various steps in the method used to repair truck tires, the reference numeral 10 designates a truck tire tube, having the portion 11 outlined by dotted lines, which has been damaged by a blowout.

In carrying out the first step of the method, the damaged portion 11 is removed from the tube, leaving the open ends 12 and 13 respectively which are annularly chamfered at 14 and 15 respectively. The second step involves the cutting of a section 16 of the same overall dimension as the portion 11 and chamfering the open ends 17 and 18 thereof at 19 and 20 respectively.

The section 16 is of the same size as the tube 10, so that when the next step is accomplished, which involves stitching the open ends 12 and 17 together by stitching 21, and the ends 13 and 18 by stitching 22, a uniformly shaped tube is provided.

The splice is buffed and an adhesive is applied thereto and the next step involves covering the splice with raw rubber 23. After this has been accomplished, the spliced portions are vulcanized, providing a smooth outer surface over the entire tube, which is now serviceable and ready for use.

Figure 7:
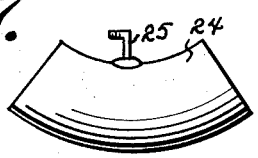

In Figure 7, it is shown that a section 24, having an air valve 25, may be inserted into the tube 10, as well, and in the same manner as the section 16.

By this method, a damaged tube can be repaired and made serviceable again.

It is believed that the method employed, and the result obtained thereby will be apparent to those skilled in the art, and it is to be understood that changes therein may be resorted to, provided such changes fall within the spirit of the invention and the scope of the appended claim.

Having thus described the invention, what is claimed as new and desired to be secured by Letters Patent is:

A method for repairing truck tubes comprising cutting a portion from said tube, chamfering the open ends of said tube, inserting a portion between said open ends, stitching said open ends together, covering the stitched ends with raw rubber and vulcanizing the raw rubber and meeting ends of said tube and said portion.

References Cited in the file of this patent

UNITED STATES PATENTS

| | | |
|---|---|---|
| 1,317,665 | Orr | Sept. 30, 1919 |
| 1,975,149 | Heintz | Oct. 2, 1934 |
| 2,229,878 | Wilson | Jan. 28, 1941 |
| 2,313,035 | Breth | Mar. 9, 1943 |
| 2,620,852 | Forbush | Dec. 9, 1952 |

FOREIGN PATENTS

| | | |
|---|---|---|
| 661,974 | France | Mar. 12, 1929 |